United States Patent Office 3,056,184
Patented Oct. 2, 1962

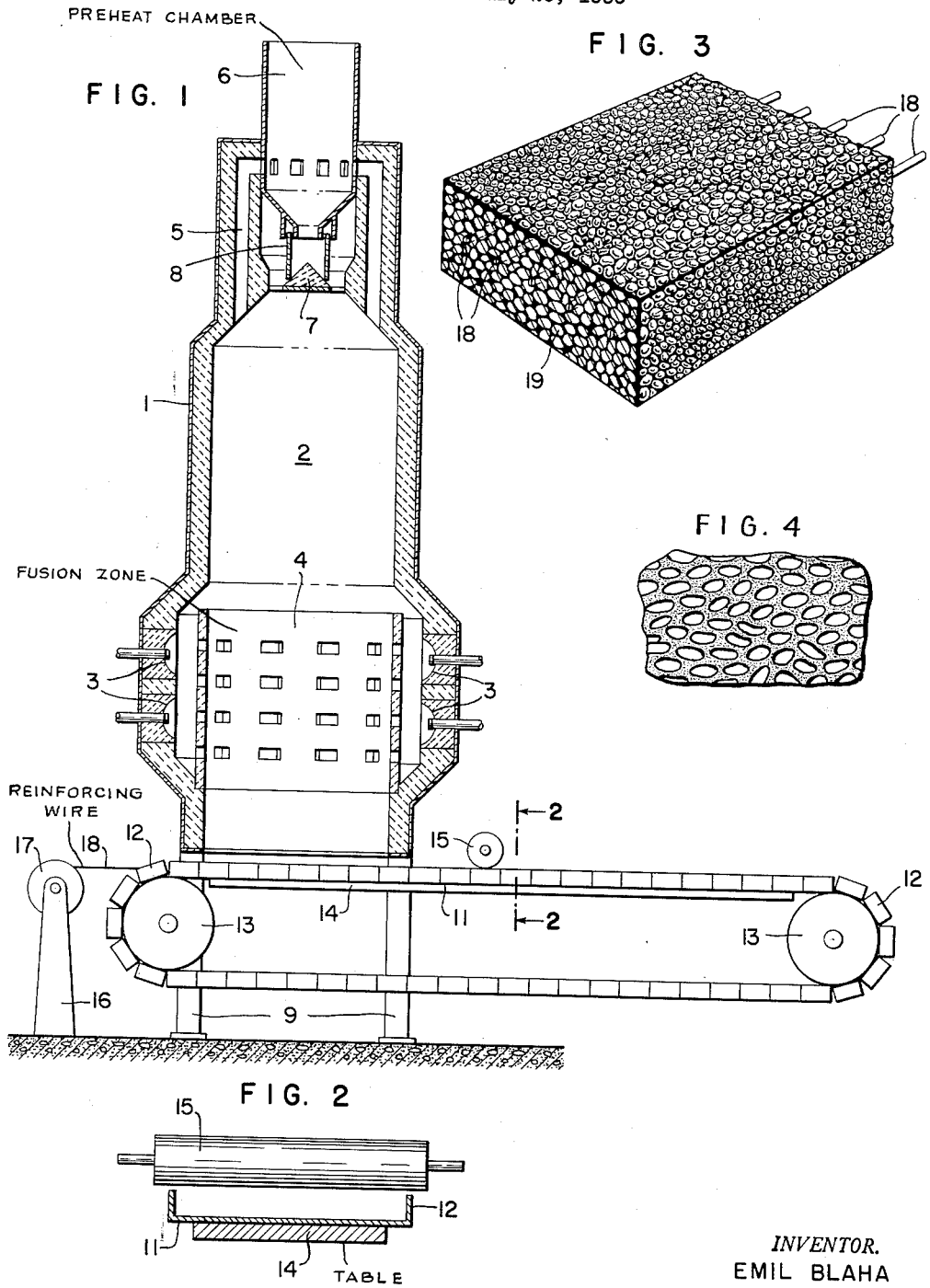

3,056,184
MANUFACTURE OF UNIFORM CELLULAR
CERAMIC ARTICLES
Emil Blaha, Cheltenham, Pa., assignor to Selas Corporation of America, Dresher, Pa., a corporation of Pennsylvania
Filed July 23, 1959, Ser. No. 828,966
5 Claims. (Cl. 25—156)

The present invention relates to a cellular ceramic product that is useful as a structural load supporting material and the method by means of which the material can be made. This application is a continuation-in-part of my application Serial Number 769,279 filed October 24, 1958, now abandoned.

There is a definite need in the building industry for a structural material that can be formed as a panel of various thicknesses and densities and is inexpensive to manufacture. The material of the present invention has these desirable characteristics, and, in addition, is non-absorbent to moisture so that it may be used as an outside wall.

It is an object of the invention to provide a cellular ceramic material that can be used for structural or other purposes and can be formed as a panel of various thicknesses and densities. It is a further object of the invention to provide a panel of cellular material that is sufficiently strong to be used for structural purposes.

In practicing the invention, material of selected composition is formed into small particles of a uniform size. These particles are dropped through a zone at a temperature sufficiently high to fuse and bloat them into individual hollow spheres of unicellular or multicellular form. These spheres are collected while their surface is still tacky. As the spheres cool they will fuse together to form a slab of cellular material that is completely impervious to moisture and has sufficient strength to be used for structural purposes.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

In the drawings:
FIG. 1 is a diagrammatic view of a particle bloating furnace,
FIG. 2 is a view taken on line 2—2 of FIG. 1,
FIG. 3 is a view of the material produced, and
FIG. 4 is an enlarged view of the surface of the material.

Apparatus with which the material can be prepared will first be described. This will preferably include a tower furnace like that shown in my copending application Serial Number 652,027 filed April 10, 1957, now abandoned. Such a furnace is shown diagrammatically in the drawing. Referring to FIG. 1, there is shown a tower furnace 1 that includes a vertically extending cylindrical furnace chamber 2 which is provided around its lower portion with a plurality of radiant cup type burners 3 that are located behind a refractory checkerwork 4. The burners are supplied with a combustible mixture of gas and air and produce radiant heat that is directed toward the checkerwork and the center of the furnace chamber. The checkerwork serves to break up any forward movement of the combustion gases and becomes incandescent to direct radiant heat across the furnace chamber. The hot products of combustion rise in the furnace chamber with a minimum of turbulence to pass through a series of ducts 5 that discharge into a preheat chamber 6 located above the furnace chamber. Between the preheat chamber and the top of the furnace chamber is apparatus for controlling the flow of particles between them. This apparatus includes a conically shaped stopper 7 that is supported concentric with chamber 2 at its upper end. A sleeve 8 of a diameter smaller than the base of stopper 7 rests on this stopper with its upper end receiving particles from chamber 6. When the sleeve engages the stopper, the flow of particles into the furnace is stopped. When the sleeve is raised an annular stream of particles flows around the stopper and drops vertically through the relatively quiet atmosphere of chamber 2. The particles fall in a straight path without engaging the side walls of the chamber.

The furnace is mounted with its open, lower end elevated above floor level by supports 9 so that a collecting apparatus may be located under it. The collection apparatus includes a conveyor belt 11 of a width equal to the diameter of the furnace and moving below its open end. The belt may be used to carry molds, but is shown herein as being provided with sides 12 so that it forms a channel in which the bloated particles are collected. The belt moves over guide rollers 13, one of which serves as a drive and may be driven at a desired speed by a conventional variable speed motor. The upper reach of the conveyor is supported by a table 14.

At times it may be desirable to compact the material as it is collected. This can be accomplished by a roller 15 that is positioned above the conveyor belt adjacent to the furnace. At times it may also be desirable to reinforce the material as it is being made. To this end there is provided a stand 16 beyond the end of the conveyor which supports a reel 17 of reinforcing material. As shown herein, the reinforcing material comprises a plurality of wires 18 that are side by side and extend along the belt between sides 12. It will be apparent that a wire mesh fabric could be used instead of wires if it was so desired.

In practicing the invention, the raw material used can be of any desired composition as long as it has the characteristic of bloating when heated to its fusion temperature. The bloating occurs as a result of the release of $CO_2$ or other gases from the material during heating. Such materials include any of the natural clays and many mixtures of materials that form essentially a glass batch. A specific mixture that is essentially a glass batch which will produce a strong, rigid product may be:

Silica _____ 8–25% by weight.
Lime and/or magnesia _____ 12–25% by weight.
Alumina _____ balance.

The raw batch incorporates the lime and magnesia at least partially as carbonates. This material has a melting range of from 2100 F. to 2800 F.

In preparing the material, the clay, or, if a glass, the thoroughly mixed ingredients of a batch, are moistened sufficiently so that they will assume the consistency of a plastic mass. This mass is then broken up into small particles of a uniform size of about $\frac{1}{16}$ to $\frac{1}{8}$ inch long and about $\frac{1}{32}$ inch in diameter. The particles are dried and are then in condition to be fused. Thus the starting material is formed into discrete particles of substantially the same size, and the particles are substantially dust free.

The particles are placed in preheat chamber 6 in sufficient quantities to keep the sleeve 8 filled at all times while the furnace is in operation. Hot products of combustion from the furnace chamber passing through ducts 5 into chamber 6 will preheat the particles to a temperature slightly below the point where their surfaces will become tacky.

When sleeve 8 is raised an annular stream or column of particles will fall through furnace chamber 2. By the time the particles pass in front of checkerwork 4 they will have been heated predominately by radiant heat to above their fusion temperature which will range from about 2100 F. to 2800 F. depending upon the composition of the starting material. As this take place, the gas generated in the particles causes them to expand or bloat into hollow spheres. The size of the spheres will be determined somewhat by the time they are above fusion temperature with the spheres growing with increased time. Since, however, the particles are originally substantially the same size and they will take the same time to fall through the furnace, the spheres will also be substantially the same size.

The spheres fall on belt 11 or a mold carried thereby and will be collected to a thickness depending upon the speed of the belt. As the surface of the spheres is still tacky when they land on the belt they will stick or fuse to each other to form a slab of cellular, agglomerated material. The initial batch used whether a clay or a form of glass will produce individual spheres and a slab, having a glazed or glasslike surface. The material, being made of individual cells, is non-porous and will not absorb water.

Ordinarily the slabs produced will have a density of from 18 to 35 pounds per cubic foot, depending upon the raw material. A slab of a density of 42 pounds per cubic foot will have a compressive strength in excess of 1200 pounds per square inch. The density of the slab can be increased by compressing it and forcing the individual spheres closer together. This can be accomplished, if desired, by moving the slab under roller 15 that is located close enough to the point of collection so the material has not cooled to a point where it is rigid. The density of the slab is varied by varying the amount it is compressed. If the slab is to be reinforced, wires 18 are threaded along the belt. The spheres will then build up around the wires so that they are completely embedded therein.

The lower surface of the slab will be smooth as determined by the surface of the belt. The upper surface will be glazed and will have an interesting pebbled pattern created by the spheres. The surface, however, is continuous. After the slab is formed it can be cut by ordinary masonry cutting tools to any desired shape and size. The cut surface will have, as shown at 19 in the drawing, a multiplicity of holes formed by the spheres that were cut. Since the interior of the spheres is also glazed and the pores or cells are discontinuous, a cut surface is as water proof as the original. In some cases it may be desirable to sprinkle a granular material such as sand on the belt before the spheres are collected. When this is done they will stick to the sand to produce a rough surface to which plaster, for example, will adhere.

The method of making the slab by collecting the spheres one on top of the other insures that the slab produced will have a uniform cellular structure throughout its thickness. After the slab has been formed it can be annealed, if necessary, to remove any internal strains that it may have. Thus there is produced a strong, rigid slab of material that has a uniform cellular structure. This material, because of its inherent characteristics is ideally suited for structural panels to be used in both the interior and exterior of buildings.

While in accordance with the provisions of the statutes, I have illustrated and described the best form of embodiment of my invention now known to me, it will be apparent to those skilled in the art that changes may be made in the form of the apparatus disclosed without departing from the spirit and scope of the invention set forth in the appended claims, and that in some cases certain features of my invention may be used to advantage without a corresponding use of other features.

What is claimed is:

1. The method of forming an agglomerated structural material which comprises dropping individual particles of a mixture capable of forming a vitreous material and having the characteristic of bloating and becoming tacky on its surface when heated, vertically downward under the force of gravity through a fusion zone, heating said particles above their fusion temperature as they pass through said zone whereby said particles are bloated into individual hollow bodies, collecting the bodies in a mass while their surfaces are still tacky whereby the bodies will stick together to form a body of cellular agglomerated material, and cooling said material to form a body of rigid material.

2. The method of claim 1 including collecting said bodies on a moving surface, moving said surface past a point of collection below said fusion zone at a rate so that the bodies collected thereon will build up to a desired thickness.

3. The method of claim 2 including compressing the material collected on said moving surface to increase its density prior to the time it has cooled enough to become rigid.

4. The method of claim 2 including placing reinforcing material above said moving surface and collecting the bodies around said reinforcing material.

5. The method of making a cellular structural material which comprises, dropping a bloatable material in the form of a multiplicity of small particles of substantially the same size of a mixture capable of forming a vitreous material and of becoming tacky on its surface when heated vertically downward under the force of gravity through a fusion zone, rapidly heating said particles to fusion temperature as they fall through said zone whereby they will be individually bloated to spherical form, collecting said particles below said fusion zone while their surfaces are still tacky as a mass of cellular material, gradually moving said mass from the collection point to form a slab, and cooling said mass so that it will become rigid.

References Cited in the file of this patent

UNITED STATES PATENTS

| 1,809,215 | Pine et al. | June 9, 1931 |
| 1,877,136 | Lee | Sept. 13, 1932 |
| 1,877,137 | Lee | Sept. 13, 1932 |
| 2,052,324 | Thomson | Aug. 25, 1936 |
| 2,187,432 | Powers | Jan. 16, 1940 |
| 2,676,892 | McLaughlin | Apr. 27, 1954 |
| 2,853,285 | Neff et al. | Sept. 23, 1958 |

FOREIGN PATENTS

| 549,723 | Canada | Dec. 3, 1957 |

UNITED STATES PATENT OFFICE
CERTIFICATE OF CORRECTION

Patent No. 3,056,184            October 2, 1962

Emil Blaha

It is hereby certified that error appears in the above numbered patent requiring correction and that the said Letters Patent should read as corrected below.

Column 2, lines 49 to 51, strike out

```
Silica------------------------------- 8-25% by weight.
Lime and/or magnesia----------------- 12-25% by weight.
Alumina------------------------------ balance.
``` and insert instead

```
Lime and/or magnesia---------------- 8-25% by weight.
Alumina----------------------------- 12-25% by weight.
Silica------------------------------ balance.
```

Signed and sealed this 5th day of February 1963.

(SEAL)
Attest:
ERNEST W. SWIDER
Attesting Officer

DAVID L. LADD
Commissioner of Patents